US012437527B2

(12) United States Patent
Zhu et al.

(10) Patent No.: US 12,437,527 B2
(45) Date of Patent: Oct. 7, 2025

(54) TRAINING INSTANCE SEGMENTATION NEURAL NETWORKS THROUGH CONTRASTIVE LEARNING

(71) Applicant: Waymo LLC, Mountain View, CA (US)

(72) Inventors: Alex Zihao Zhu, Mountain View, CA (US); Vincent Michael Casser, Cambridge, MA (US); Henrik Kretzschmar, Neu-Ulm (DE); Reza Mahjourian, Austin, TX (US); Soeren Pirk, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 365 days.

(21) Appl. No.: 18/136,252

(22) Filed: Apr. 18, 2023

(65) Prior Publication Data

US 2023/0334842 A1    Oct. 19, 2023

Related U.S. Application Data

(60) Provisional application No. 63/332,213, filed on Apr. 18, 2022.

(51) Int. Cl.
G06V 10/82         (2022.01)
G06V 10/774        (2022.01)

(52) U.S. Cl.
CPC ............ *G06V 10/82* (2022.01); *G06V 10/774* (2022.01)

(58) Field of Classification Search
None
See application file for complete search history.

(56) References Cited

U.S. PATENT DOCUMENTS

2020/0097742 A1*   3/2020   Ratnesh Kumar ..... G06N 3/047

OTHER PUBLICATIONS

Arnab et al., "Higher order conditional random fields in deep neural networks," Computer Vision—ECCV 2016, Sep. 17, 2016, 24 pages.
Arnab et al., "Pixelwise instance segmentation with a dynamically instantiated network," Proceedings of the IEEE Conference on Computer Vision and Pattern Recognition (CVPR), 2017, pp. 441-450.
Bai et al., "Deep watershed transform for instance segmentation," Proceedings of the IEEE Conference on Computer Vision and Pattern Recognition (CVPR), 2017, pp. 5221-5229.

(Continued)

*Primary Examiner* — Leon Flores
(74) *Attorney, Agent, or Firm* — Fish & Richardson P.C.

(57) ABSTRACT

Methods, systems, and apparatus for processing inputs that include video frames using neural networks. In one aspect, a system comprises one or more computers configured to obtain a set of one or more training images and, for each training image, ground truth instance data that identifies, for each of one or more object instances, a corresponding region of the training image that depicts the object instance. For each training image in the set, the one or more computers process the training image using an instance segmentation neural network to generate an embedding output comprising a respective embedding for each of a plurality of output pixels. The one or more computers then train the instance segmentation neural network to minimize a loss function.

20 Claims, 5 Drawing Sheets

(56) References Cited

OTHER PUBLICATIONS

Bewley et al., "Range conditioned dilated convolutions for scale invariant 3D object detection," CoRR, May 20, 2020, arxiv.org/abs/2005.09927, 16 pages.
Caesar et al., "nuscenes: A multimodal dataset for autonomous driving," CoRR, Mar. 26, 2019, arxiv.org/abs/1903.11027, 16 pages.
Chen et al., "A simple framework for contrastive learning of visual representations," CoRR, Feb. 13, 2020, arxiv.org/abs/2002.05709, 20 pages.
Chen et al., "Attention to scale: Scale-aware semantic image segmentation," Proceedings of the IEEE Conference on Computer Vision and Pattern Recognition (CVPR), 2016, pp. 3640-3649.
Chen et al., "BlendMask: Top-down meets bottom-up for instance segmentation," Proceedings of the IEEE/CVF Conference on Computer Vision and Pattern Recognition (CVPR), 2020, pp. 8573-8581.
Chen et al., "Deeplab: Semantic image segmentation with deep convolutional nets, atrous convolution, and fully connected crfs," IEEE Transactions on Pattern Analysis and Machine Intelligence, Apr. 27, 2017, 40(4):834-848.
Chen et al., "Hierarchical aggregation for 3D instance segmentation," Proceedings of the IEEE/CVF International Conference on Computer Vision (ICCV), 2021, pp. 15467-15476.
Chen et al., "Multi-view 3D object detection network for autonomous driving," 2017 IEEE Conference on Computer Vision and Pattern Recognition, 2017, pp. 6526-6534.
Chen et al., "Naive-student: Leveraging semisupervised learning in video sequences for urban scene segmentation," Computer Vision—ECCV 2020, Nov. 5, 2020, 19 pages.
Chen et al., "Tensormask: A foundation for dense object segmentation," Proceedings of the IEEE/CVF International Conference on Computer Vision (ICCV), 2019, pp. 2061-2069.
Cheng et al., "Panoptic-deeplab: A simple, strong, and fast baseline for bottom-up panoptic segmentation," Proceedings of the IEEE/CVF Conference on Computer Vision and Pattern Recognition (CVPR), 2020, pp. 12475-12485.
Cordts et al., "The cityscapes dataset for semantic urban scene understanding," Proceedings of the IEEE Conference on Computer Vision and Pattern Recognition (CVPR), 2016, pp. 3213-3223.
Dai et al., "Convolutional feature masking for joint object and stuff segmentation," Proceedings of the IEEE Conference on Computer Vision and Pattern Recognition (CVPR), 2015, pp. 3992-4000.
Dai et al., "Instance-sensitive fully convolutional networks," Computer Vision—ECCV 2016, Sep. 17, 2016, pp. 534-549.
De Brabandere et al., "Semantic instance segmentation with a discriminative loss function," CoRR, Aug. 8, 2017, arxiv.org/abs/1708.02551, 10 pages.
Engelmann et al., "3D-MPA: Multi-proposal aggregation for 3D semantic instance segmentation," Proceedings of the IEEE/CVF Conference on Computer Vision and Pattern Recognition (CVPR), 2020, pp. 9031-9040.
Fathi et al., "Semantic instance segmentation via deep metric learning," CoRR, Mar. 30, 2017, arxiv.org/abs/1703.10277, 9 pages.
Gao et al., "SSAP: Single-shot instance segmentation with affinity pyramid," CoRR, Sep. 4, 2019, arxiv.org/abs/1909.01616, 10 pages.
Geiger et al., "Vision meets robotics: The KITTI dataset," The International Journal of Robotics Research, 2013, 32(11):1231-1237.
Girshick et al., "Rich feature hierarchies for accurate object detection and semantic segmentation," Proceedings of the IEEE Conference on Computer Vision and Pattern Recognition (CVPR), 2014, pp. 580-587.
Hariharan et al., "Hypercolumns for object segmentation and fine-grained localization," Proceedings of the IEEE Conference on Computer Vision and Pattern Recognition (CVPR), 2015, pp. 447-456.
He et al., "Mask R-CNN," Proceedings of the IEEE International Conference on Computer Vision (ICCV), 2017, pp. 2961-2969.
Hu et al., "Learning a spatio-temporal embedding for video instance segmentation," CoRR, Dec. 19, 2019, arxiv.org/abs/1912.08969, 17 pages.
Jonschkowski et al., "What matters in unsupervised optical flow," Computer Vision—ECCV 2020, Nov. 3, 2020, pp. 557-572.
Kirillov et al., "Panoptic feature pyramid networks," Proceedings of the IEEE/CVF Conference on Computer Vision and Pattern Recognition (CVPR), 2019, pp. 6399-6408.
Kong et al., "Recurrent pixel embedding for instance grouping," Proceedings of the IEEE Conference on Computer Vision and Pattern Recognition (CVPR), 2018, pp. 9018-9028.
Landrieu et al., "Large-scale point cloud semantic segmentation with superpoint graphs," Proceedings of the IEEE Conference on Computer Vision and Pattern Recognition (CVPR), 2018, pp. 4558-4567.
Lang et al., "Pointpillars: Fast encoders for object detection from point clouds," Proceedings of the IEEE/CVF Conference on Computer Vision and Pattern Recognition (CVPR), 2019, pp. 12697-12705.
Liang et al., "Instance segmentation in 3D scenes using semantic superpoint tree networks," Proceedings of the IEEE/CVF International Conference on Computer Vision (ICCV), 2021, pp. 2783-2792.
Liao et al., "KITTI-360: A novel dataset and benchmarks for urban scene understanding in 2D and 3D," CoRR, Sep. 28, 2021, arxiv.org/abs/2109.13410, 32 pages.
Lin et al., "Microsoft COCO: Common objects in context," Computer Vision—ECCV 2014, 2014, pp. 740-755.
Liu et al., "Semantic image segmentation via deep parsing network," Proceedings of the IEEE International Conference on Computer Vision (ICCV), 2015, pp. 1377-1385.
Long et al., "Fully convolutional networks for semantic segmentation," Proceedings of the IEEE Conference on Computer Vision and Pattern Recognition (CVPR), 2015, pp. 3431-3440.
Neven et al., "Instance segmentation by jointly optimizing spatial embeddings and clustering bandwidth," Proceedings of the IEEE/CVF Conference on Computer Vision and Pattern Recognition (CVPR), 2019, pp. 8837-8845.
Newell et al., "Associative embedding: End-to-end learning for joint detection and grouping," Advances in Neural Information Processing Systems 30 (NIPS 2017), 2017, 11 pages.
Porzi et al., "Seamless scene segmentation," Proceedings of the IEEE/CVF Conference on Computer Vision and Pattern Recognition (CVPR), 2019, pp. 8277-8286.
Qi et al., "Pointnet: Deep learning on point sets for 3D classification and segmentation," Proceedings of the IEEE Conference on Computer Vision and Pattern Recognition (CVPR), 2017, pp. 652-660.
Qi et al., "Pointnet++: Deep hierarchical feature learning on point sets in a metric space," Advances in Neural Information Processing Systems 30 (NIPS 2017), 2017, 10 pages.
Sun et al., "Scalability in perception for autonomous driving: Waymo open dataset," Proceedings of the IEEE/CVF Conference on Computer Vision and Pattern Recognition (CVPR), 2020, pp. 2446-2454.
Wang et al., "Associatively segmenting instances and semantics in point clouds," Proceedings of the IEEE/CVF Conference on Computer Vision and Pattern Recognition (CVPR), 2019, pp. 4096-4105.
Wang et al., "Max-DeepLab: End-to-end panoptic segmentation with mask transformers," Proceedings of the IEEE/CVF Conference on Computer Vision and Pattern Recognition (CVPR), 2021, pp. 5463-5474.
Wang et al., "Occlusion aware unsupervised learning of optical flow," Proceedings of the IEEE Conference on Computer Vision and Pattern Recognition (CVPR), 2018, pp. 4884-4893.
Wang et al., "Pillar-based object detection for autonomous driving," Computer Vision—ECCV 2020, Nov. 17, 2020, 18 pages.
Xiong et al., "Upsnet: A unified panoptic segmentation network," Proceedings of the IEEE/CVF Conference on Computer Vision and Pattern Recognition (CVPR), 2019, pp. 8818-8826.
Yang et al., "Pixor: Real-time 3D object detection from point clouds," Proceedings of the IEEE Conference on Computer Vision and Pattern Recognition (CVPR), 2018, pp. 7652-7660.

(56) References Cited

OTHER PUBLICATIONS

Yi et al., "GSPN: Generative shape proposal network for 3D instance segmentation in point cloud," Proceedings of the IEEE/CVF Conference on Computer Vision and Pattern Recognition (CVPR), 2019, pp. 3947-3956.
Yu et al., "Dilated residual networks," Proceedings of the IEEE Conference on Computer Vision and Pattern Recognition (CVPR), 2017, pp. 472-480.
Zhao et al., "Pyramid scene parsing network," Proceedings of the IEEE Conference on Computer Vision and Pattern Recognition (CVPR), 2017, pp. 2881-2890.
Zhou et al., "Voxelnet: End-to-end learning for point cloud based 3D object detection," Proceedings of the IEEE Conference on Computer Vision and Pattern Recognition (CVPR), 2018, pp. 4490-4499.

* cited by examiner

TRAINING INSTANCE SEGMENTATION NEURAL NETWORKS THROUGH CONTRASTIVE LEARNING

CROSS-REFERENCE TO RELATED APPLICATION

This application claims priority to U.S. Provisional Application No. 63/332,213, filed on Apr. 18, 2022. The disclosure of the prior application is considered part of and is incorporated by reference in the disclosure of this application.

BACKGROUND

This specification relates to processing inputs that include video frames using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current value inputs of a respective set of parameters.

BRIEF DESCRIPTION OF THE DRAWINGS

Like reference numbers and designations in the various drawings indicate like elements.

DETAILED DESCRIPTION

Figure 1:
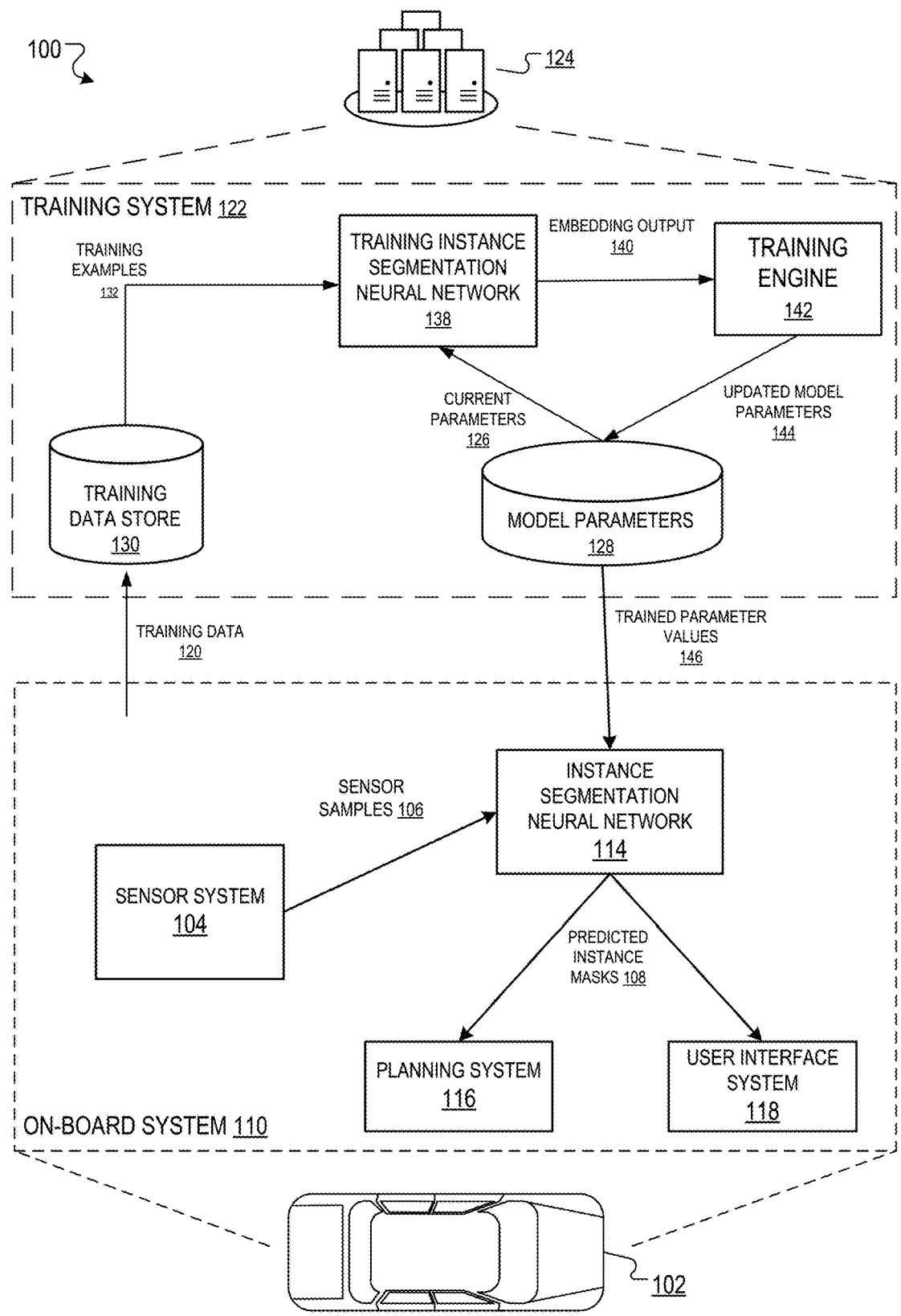
FIG. 1 is a block diagram of an example system.

This specification describes a system implemented as computer programs on one or more computers in one or more locations that trains a neural network to perform instance segmentation for images. Performing instance segmentation refers to, for each of a plurality of pixels in an image, assigning the pixel to a respective object instance. For example, an instance segmentation output for a given image can assign, to each of a plurality of pixels in the image, an identifier from a set of identifiers, with each identifier in the set corresponding to a different object instance. Thus, the output of the instance segmentation identifies, for each of one or more object instances, the pixels in the image that depict the object instance. An "object instance" is a unique instance of an object that is depicted in an image, e.g., so that an image that depicts two different cars would be considered to depict two different instances of the car object.

As one example, autonomous vehicles can use an on-board sensor system to capture a sensor measurement of a scene in an environment and then perform instance segmentation to identify object instances in the scene using the sensor measurement. For example, a sensor system can include multiple sensor modalities, such as a LIDAR sensor that captures LIDAR range images and a camera sensor that captures camera images.

Though LIDAR sensors generally provide accurate readings of objects within a certain range of distance, the accuracy of LIDAR sensors can be negatively affected by certain environment conditions. Cameras, on the other hand, can perceive objects in an environment at longer ranges of distance than LIDAR sensors, but cameras generally do not measure the range of objects and can also be affected by environment conditions, such as low or glaring bright lighting conditions. Thus, training an instance segmentation neural network on sensor images using conventional training techniques can be difficult due to potentially low reliability of the sensor training images.

Additionally, some existing techniques attempt to train neural networks to perform instance segmentation by training the instance segmentation neural network on manually labeled data. In particular, these techniques require a set of labeled training data that includes multiple labeled training examples that include labels for every pixel in the image. Generating a large data set of such manually labeled examples can be time consuming and expensive.

To mitigate these issues, this specification describes a system for training an instance segmentation neural network to generate accurate instance segmentation labels using contrastive learning.

In particular, the system applies contrastive learning to sensor images by generating an embedding output for the sensor images using the instance segmentation neural network. Additionally, the system generates positive pairs of embeddings that are associated with the same object instance within the sensor image and negative pairs of embeddings that are associated with different object instances within the sensor image. The system can then use contrastive learning to train the neural network to place positive embeddings in proximity to each other within the embedding output and negative embeddings further from each other within the embedding output, which can result in more efficient training. That is, using a contrastive learning loss can result in the instance segmentation neural network being more robust and generalizing better when used to perform instance segmentation after training than using a conventional loss that directly measures errors in instance segmentation outputs.

In some examples, the system can, during the training of an instance segmentation neural network associated with a respective sensor modality, e.g., during the training of an instance segmentation neural network to process LIDAR range images or camera images, incorporate contrastive learning across sensor modalities, across time, or both. That is, the system can include, in the positive and negative pairs for a given training image, embeddings for one or more images from another sensor modality, embeddings from a temporally adjacent image, or both. Training on temporally adjacent images allows the neural network to generate embeddings that are consistent across time and different object views, i.e., robust to viewpoint variations. Training on images from another modality allows the neural network to generate embeddings that are consistent across sensor modalities.

Thus, the described contrastive loss allows the system to leverage different sensors and to improve overall instance segmentation performance using contrastive learning.

In some examples, the system can also use an optical flow neural network to generate additional positive embeddings and negative embeddings for temporally adjacent sensor images, which the system can use to extend contrastive learning to partially labeled sensor images without requiring the use of fully labeled training examples and without requiring the instance labels to be consistent across time.

FIG. 1 shows an example system 100. The system 100 includes an on-board system 110 and a training system 122.

The on-board system 110 is located on-board a vehicle 102. The vehicle 102 in FIG. 1 is illustrated as an automobile, but the on-board system 110 can be located on-board any appropriate vehicle type.

In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 102 can alert the driver of the vehicle 102 or take an autonomous driving action when an obstacle is detected, when the vehicle departs from a driving lane, or when an object is detected in a blind spot of the human driver.

The on-board system 110 includes a sensor system 104 which enables the on-board system 110 to "see" the environment in the vicinity of the vehicle 102. More specifically, the sensor system 104 includes one or more sensors, some of which are configured to receive reflections of electromagnetic radiation from the environment in the vicinity of the vehicle 102. For example, the sensor system 104 can include one or more laser sensors (e.g., LIDAR laser sensors) that are configured to detect reflections of laser light. As another example, the sensor system 104 can include one or more radar sensors that are configured to detect reflections of radio waves. As another example, the sensor system 104 can include one or more camera sensors that are configured to detect reflections of visible light.

The sensor system 104 continually (i.e., at each of multiple time points) captures raw sensor data, which can indicate the directions, intensities, and distances travelled by reflected radiation. For example, a sensor in the sensor system 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

As the vehicle 102 navigates through the environment, various sensors capture measurements of the environment. For example, a camera sensor, a LIDAR sensor, or both, can repeatedly capture sensor samples 106 during the navigation. The sensor samples 106 can include multiple consecutive camera images (e.g., red green blue (RGB) images) taken by a camera for a certain temporal sequence on-board the sensor system of a vehicle, such as the sensor system 104. For example, the sensor sample 106 can include a respective camera image for a temporal sequence corresponding to each of the multiple cameras. Additionally, the sensor samples 106 can include multiple consecutive point clouds captured by a LIDAR sensor (e.g., LIDAR images) for a certain temporal sequence.

The sensor system 104 can send the sensor samples 106 to an instance segmentation neural network 114, also on-board the vehicle 102. In some examples, the system can include multiple instance segmentation neural networks that each process sensor samples 106 of a different sensor modality.

For example, a first instance segmentation neural network 114 can process camera images included in the sensor samples 106, and a separate second instance segmentation neural network 114 can process LIDAR range images included in the sensor samples 106 that are generated from LIDAR measurements.

A LIDAR range image generated from a LIDAR sensor measurement includes a plurality of pixels arranged in a two-dimensional grid and includes, for each pixel, a respective value for each of one or more channels. Generally, one of the channels is a range channel that has a value that specifies a range of the location in the environment corresponding to the pixel relative to the LIDAR sensor. When there are multiple channels, the other channels can include other attributes, e.g., intensity (reflection strength), elongation, second return, and so on.

Each pixel in the LIDAR range image corresponds to one laser shot, with a specific elevation and azimuth angle of the laser ray of the LIDAR sensor. More specifically, the LIDAR range image is an H×W×C image, where H is the number of laser beams in the LIDAR sensor, W is the number of shots per laser per frame, and C is the number of channels in the LIDAR range image. Thus, each pixel in the LIDAR range image corresponds to a shot by one of the lasers of the LIDAR sensor at the time point corresponding to the frame.

The instance segmentation neural network 114 can process the sensor samples 106 to generate a predicted embedding output. The instance segmentation neural network 114 generates the predicted embedding output using sensor samples 106, i.e., images, from a respective sensor modality (e.g., camera sensors or LIDAR sensors) by processing the sensor sample 106 to generate the predicted embedding output.

The predicted embedding output includes embeddings for each of a plurality of output pixels.

In some implementations, each output pixel corresponds to a different pixel in the sensor sample, such that the instance segmentation neural network generates a respective embedding for each pixel in the sensor sample.

In some other implementations, each output pixel corresponds to a region of multiple pixels in the sensor sample, such that the instance segmentation neural network generates a respective embedding for each region in the sensor sample.

An embedding, as used in this specification, is a vector or other ordered collection of numerical values having a fixed dimensionality. For example, each embedding can be a vector having a fixed number, e.g., 32, 64, or 128, of channels.

The instance segmentation neural network can have any appropriate architecture that allows the segmentation neural network to map an input image to a set of embeddings for the output pixels. For example, the instance segmentation neural network can be a convolutional neural network, e.g., one that has an architecture that is based on a Panoptic DeepLab model. As another example, the instance segmentation neural network can have a Transformer architecture, e.g., one that has a Vision Transformer architecture.

In some examples, the instance segmentation neural network 114 can use the predicted embedding output to generate a predicted instance mask 108.

The predicted instance mask 108 for a given image in a given sensor sample 106 includes corresponding object instance identifiers and, optionally, semantic class labels for each pixel of the image.

The semantic class label for a given pixel identifies a semantic category to which the object depicted at the pixel belongs. Categories of the semantic class labels can include any of: a vehicle, a human, an animal, a building, flat structures, vegetation, sky, and so on. Generally, the class labels can include one or more classes for types of foreground or dynamic objects, e.g., vehicles, pedestrians, animals, and one or more classes for background or static objects, e.g., buildings, vegetation, or sky.

The object instance identifiers are unique identifiers for object instances, such that different instances of objects from the same semantic class have different identifiers. For example, an object identifier can label a pixel as corresponding to a first pedestrian (e.g., pedestrian 1) and a second pixel as corresponding to a second pedestrian (e.g., pedestrian 2) in the scene.

Thus, the predicted instance masks 108 can include, for each of multiple output pixels that each correspond to a pixel of the sensor sample 106 or a region of pixels of the sensor sample 106, an associated predicted object instance.

The instance segmentation neural network 114 can generate predicted instance masks 108 for an image of a given sensor modality as described in further detail below with reference to FIGS. 2, 3, and 4.

The on-board system 110 can provide the predicted instance masks 108 generated by the instance segmentation neural network 114 to a planning system 116, a user interface system 118, or both.

When the planning system 116 receives the predicted instance masks 108, the planning system 116 can use the predicted instance masks 108 to make fully-autonomous or partly-autonomous driving decisions. For example, the planning system 116 can generate a fully-autonomous plan to navigate the vehicle 102 to avoid a collision with another agent by changing the future trajectory of the vehicle 102 to avoid the agent. In a particular example, the on-board system 110 may provide the planning system 116 with the predicted instance masks 108, and the planning system 116 can use the predicted instance masks 108 to plan a trajectory of the vehicle 102 in order to identify the static object. The fully-autonomous or partly-autonomous driving decisions generated by the planning system 116 can be implemented by a control system of the vehicle 102.

When the user interface system 118 receives the predicted instance masks 108, the user interface system 118 can use the predicted instance masks 108 to present information to the driver of the vehicle 102 to assist the driver in operating the vehicle 102 safely. The user interface system 118 can present information to the driver of the vehicle 102 by any appropriate means, for example, by an audio message transmitted through a speaker system of the vehicle 102 or by alerts displayed on a visual display system in the vehicle (e.g., an LCD display on the dashboard of the vehicle 102). In a particular example, the on-board system 110 may provide the user interface system 118 with the predicted instance masks 108, and the planning system 116 can use the predicted instance masks 108 to plan a trajectory of the vehicle 102 in order to identify the static object.

In some cases, the on-board system 110 can generate training data 120 used by a training system 122 to determine trained parameter values of the instance segmentation neural network 114. The on-board system 110 can provide the training data 120 to the training system 122 in offline batches or in an online fashion, for example, continually whenever it is generated.

The training system 122 is typically hosted within a data center 124, which can be a distributed computing system having hundreds or thousands of computers in one or more locations.

The training system 122 can store the training data 120 in a training data store 130.

The training system 122 includes at least one training instance segmentation neural network 138 that is configured to generate an embedding output 140 from training examples 132. In some examples, the training system 122 can include a training instance segmentation neural network associated with processing LIDAR images and another training instance segmentation neural network associated with processing camera images.

The training system 122 includes multiple computing devices having software or hardware modules that implement the respective operations of each layer of the training instance segmentation neural network 138 according to an architecture of the training instance segmentation neural network 138. Each training instance segmentation neural network 138 generally has (at least partially) the same architecture as the corresponding on-board instance segmentation neural network 114.

The training instance segmentation neural network 138 is configured to obtain training examples 132 from the training data store 130. The training examples 132 can be a subset of the training data 120. The training examples 132 in the training data store 130 may be obtained from real or simulated driving data logs.

The training system 122 trains a training instance segmentation neural network 138 on training examples 132 corresponding to a respective modality. For example, each of the training examples 132 can include camera images, LIDAR images, or both. The camera images and the LIDAR images can be temporally co-occurring images, i.e., images at the same time point within a temporal sequence of images generated by a given set of sensors. That is, the images from the two different modalities can be captured within a specified time window of one another by the same set of sensors.

For example, the training system 122 can train a training instance segmentation neural network 138 to process camera images in order to generate an embedding output 140.

In another example, the training system 122 can train a training instance segmentation neural network to process LIDAR images in order to generate the embedding output 140.

As part of the training, the training system 122 identifies, from each embedding output 140, positive instance embedding pairs and negative instance embedding pairs for each sensor modality, as described in further detail below with reference to FIGS. 2 and 4.

In some examples, the training system 122 is configured to use an optical flow neural network to obtain additional positive embedding pairs and negative embedding pairs for a given training example from a temporally adjacent training example.

The optical flow neural network is trained to predict optical flow between temporally adjacent images, e.g., between an image in one training example and a temporally adjacent image in another training example. That is, the two images are temporally adjacent, so that the two images are taken at consecutive time point within a sequence a temporal sequence of images generated by a given set of sensors.

The optical flow neural network can be any appropriate pre-trained optical flow neural network, e.g., a convolutional optical flow neural network that has been trained through supervised or unsupervised learning.

The system 122 then processes the optical flow predictions to generate positive embedding pairs and negative embedding pairs for preceding or subsequent sensor images of the temporal sequence, as described in further detail below with reference to FIG. 5. The training system 122 can use the additional positive embeddings and negative embeddings as part of the contrastive loss to more efficiently train the instance segmentation neural network 138.

The training engine 142 trains the training instance segmentation neural network 138 on the training examples 132 to minimize a contrastive loss function using the positive embeddings and negative embeddings, as described in more detail below. That is, the training engine 142 generates updated model parameter values 144 using the positive embedding pairs and the negative embedding pairs. The training engine 142 can then update the collection of model parameters 128 using the updated model parameter values 144.

In some implementations, by making use of the optical flow predictions, the training engine 180 can the one or more training instance segmentation neural networks without requiring users to manually generate instance segmentation labels that are consistent across time.

Once the parameter values of the multiple neural network (s) have been fully trained, the training system 122 can send the trained parameter values 146 to the on-board system for use by the instance segmentation neural network 114, e.g., through a wired or wireless connection.

While this specification describes that the predicted instance masks 108 are generated on-board an autonomous vehicle, more generally, the described techniques can be implemented on any system of one or more computers that receives images of scenes in an environment. That is, once the training system 122 has trained the instance segmentation neural network 114, the trained neural network can be used by any system of one or more computers.

As one example, the predicted instance masks 108 can be generated on-board a different type of agent that has a camera sensor and that interacts with objects as it navigates through an environment. For example, the predicted instance masks 108 can be generated by one or more computers embedded within a robot or other agent.

As another example, the predicted instance masks 108 can be generated by one or more computers that are remote from the agent and that receive images captured by one or more camera sensors of the agent. In some of these examples, the one or more computers can use the predicted instance masks 108 to generate control decisions for controlling the agent and then provide the control decisions to the agent for execution by the agent.

Figure 2:
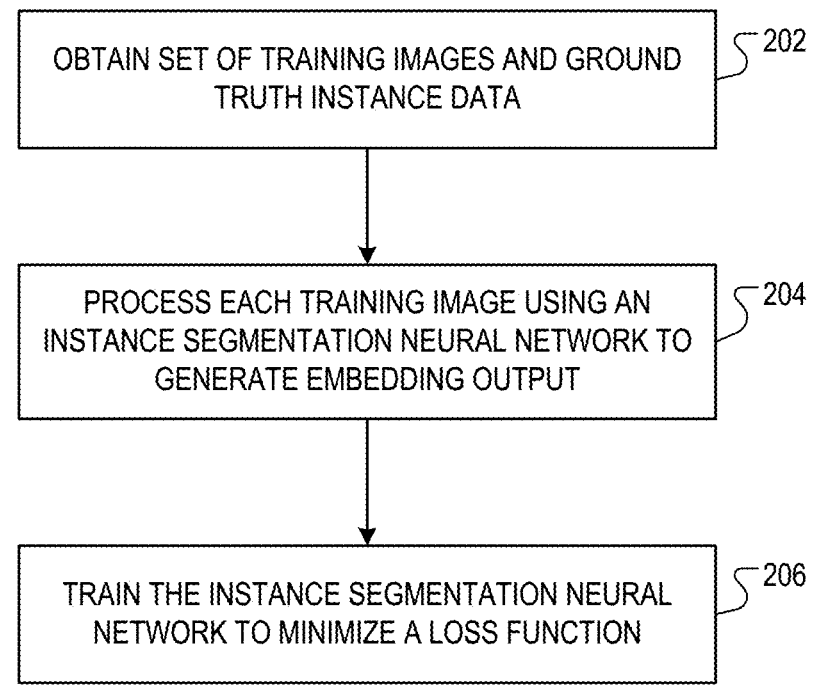
FIG. 2 is a flow diagram of an example process for training an instance segmentation neural network.

FIG. 2 is a flow diagram of an example process 200 for training an instance segmentation neural network. For convenience, the process 200 will be described as being performed by a system of one or more computers located in one or more locations. For example, a system, e.g., the training system 122 of FIG. 1, appropriately programmed in accordance with this specification, can perform the process 200.

The system can repeatedly perform iterations of the process 200 for different sets of training images to train the instance segmentation neural network.

For example, the system can repeatedly perform iterations of the process 200 on different batches of training images to update the parameters of the neural network.

That is, at each iteration of the process 200, the system obtains a batch of training images, e.g., by sampling the batch from a larger set of training data, and uses the batch of one or more training images to update the parameters of the neural network.

The system can continue performing iterations of the process 200 until termination criteria for the training of the neural network have been satisfied, e.g., until the parameters have converged, until a threshold amount of wall clock time has elapsed, or until a threshold number of iterations of the process 200 have been performed.

The system obtains a set of one or more training images and ground truth instance data for each of the one or more training images (202).

The ground truth instance data for each training image identifies, for each of one or more object instances, a corresponding region of the training image that depicts the object instance. That is, the ground truth instance data identifies, for each of the one or more object instances, the pixels within the training image that depict the object instance.

The system processes each training image using the instance segmentation neural network to generate an embedding output (204).

The embedding output for a given training image includes a respective embedding for each of a first group of first output pixels within the training image.

In some examples, the embedding output also includes a respective embedding for each of a second group of first output pixels. That is, the first group of output pixels is a subset of the total number of output pixels for which the instance segmentation neural network generates embeddings.

In these examples, for each training image in the set, the system randomly samples the first group of first output pixels from the larger set of output pixels, e.g., a set of output pixels that includes both the first group of first output pixels and the second group of first output pixels.

For each of the one or more object instances, the system generates multiple positive embedding pairs and multiple negative embedding pairs.

For example, for each object instance, the system can identify all possible positive embedding pairs from the first group or can generate positive pairs until a maximum number of positive pairs have been generated.

Each positive embedding pair includes a respective embedding for a respective first output pixel that is within the region of the training image that depicts the object instance and a respective embedding for another first output pixel that is also within the region of the training image that depicts the object instance. Thus, both embeddings in the positive pair are for output pixels that are within the region of the training image that depicts the object instance.

The system also uses the first output pixels of the first group to generate negative embedding pairs for the object instance.

Each negative embedding pair includes a respective embedding for a respective first output pixel that is within the region of the training image that depicts the object instance and a respective embedding for another first output pixel that is not within the region of the training image that depicts the object instance. Thus, only one embedding in the negative pair is for an output pixel that is within the region of the training image that depicts the object instance.

For example, the system can generate all possible unique negative pairs or can generate negative pairs until a predetermined number of negative pairs is generated.

In some examples, for one or more of the training images, the system can obtain another image from a different modality captured within a specified time window of the training image. That is, the other image is co-occurring with the training image, i.e., is captured at substantially the same time as the training image. For example, the training image can be a camera image captured by a camera, and the other image can be a LIDAR range image generated from measurements of a LIDAR sensor.

The system can obtain second ground truth object instance data for the other image that, for each of one or more object instances depicted in the training image, identifies a corresponding region of the other image that also depicts the object instance. For example, the training image and the other image may have been labeled by a user in a way that is consistent across sensor modalities. As another example, the system can generate the second ground truth object instance data by mapping regions in the training image to corresponding regions in the other image using sensor calibration data.

In some examples, the system can process the other image using a second instance segmentation neural network to generate a third embedding output. The third embedding output includes a respective embedding for each of a fourth group of third output pixels for the other image.

In these examples, the system can generate additional positive embedding pairs and negative embedding pairs using the third embedding output.

For example, for each of the one or more object instances that have a corresponding region in the training image, the system can generate a set of additional positive pairs, with each additional positive embedding pairs including (i) a respective embedding for a respective first output pixel that is within the region of the training image that depicts the object instance and (ii) a respective embedding for a respective third output pixel from the fourth plurality that is within the region of the other image that depicts the object instance. For example, the system can select, as an additional positive pair, each pair of output pixels that satisfies (i) and (ii) or can randomly select a specified number of output pixel pairs that satisfy (i) and (ii).

As another example, for each of the one or more object instances that have a corresponding region in the training image, the system can generate a set of additional negative pairs, with each additional negative embedding pair including (i) a respective embedding for a respective first output pixel that is within the region of the training image that depicts the object instance and (ii) a respective embedding for a respective third output pixel from the fourth plurality of third output pixels that is not within the region of the other image that depicts the object instance. For example, the system can select, as an additional positive pair, each pair of output pixels that satisfies (i) and (ii) or can randomly select a specified number of output pixel pairs that satisfy (i) and (ii).

In some implementations, instead of or in addition to using the image from the other modality to generate additional positive and negative pairs, the system uses a temporally adjacent image of the same modality to generate additional positive and negative pairs. This is described in more detail below with reference to FIG. 5.

The system then trains the instance segmentation neural network to minimize a loss function (206).

The loss function includes a first term (a contrastive loss $l_c$) that encourages embeddings within positive embedding pairs to be more similar to one another than per-pixel embeddings within negative embedding pairs. As one example, the first term can be defined by Equation 1 as:

$$l_c = \frac{1}{\|U\|} \sum_{i,j \in U}^{1} [id(i) = id(j)] \exp l_{i,j} \qquad (1)$$

where U is a number of embedding samples, id(i) is the mask identification of a point (output pixel) i, i.e., the object instance identifier for point i, id(j) is the mask identification of a point j, and $l_{i,j}$ is a measure of the loss of an embedding pair that includes the point i and the point j.

The loss $l_{i,j}$ for a given pair is based on a similarity of the embeddings $e_i$ and $e_j$ in the pair. As one example the loss can be defined by Equation 2 as:

$$l_{i,j} = -\log \frac{\exp(\text{sim}(e_i, e_j)/\tau)}{\sum_{k \in U}^{1} [id(i) \neq id(k)] \exp(\text{sim}(e_i, e_j)/\tau)} \qquad (2)$$

where τ denotes a temperature hyperparameter. The system uses the similarity function, sim, to compute the cosine similarity between two normalized embedding vectors x and y, which is defined by Equation 3 as:

$$\text{sim}(x, y) = \frac{x^T y}{\|x\|_2 \|y\|_2} \qquad (3)$$

where the embedding vector x is embedding $e_i$ and the embedding vector y is embedding $e_j$. Thus, the similarity between a first embedding $e_i$ and a second embedding $e_j$ is an exponentiation of a cosine similarity (sim) between $e_i$ and $e_j$.

Additionally, the loss $l_{i,j}$ includes a sum of the similarities between the embeddings in negative embedding pairs that include the first embedding and a respective other embedding, where the respective other embedding can be the second embedding or another embedding.

Thus, for a given positive pair that includes a first embedding and a second embedding, the first term (contrastive loss) is based on a ratio between (i) a similarity between the given first embedding and the given second embedding and (ii) a sum of the similarities between the embeddings in negative embedding pairs that include the given first embedding and a respective other embedding. More specifically, the first term is based on a negative logarithm of the ratio.

In some examples, the loss function also includes a regularization term over a norm of a set of embeddings that includes the respective embeddings for the first group of output pixels and the second group of output pixels. The regularization term allows for stability over the norm of the embeddings and is defined by Equation 4 as:

$$l_r = \frac{1}{\|h \times w\|} \sum_{x,y} \|E(x, y)\|_2 \qquad (4)$$

where h and w are the height and width of the embedding output, E is the embedding output, x ranges from 1 to h (or 0 to h−1) and y ranges from 1 to w (or 0 to w−1).

Additionally, in some examples, the loss function includes another term, $l_{cen}$, that measures errors in instance segmentation outputs for the one or more training images. During training, the system can generate a target ground truth heat map for each object instance by projecting a Gaussian distribution with standard deviation around the geometric center of a ground truth instance. The system then trains the instance segmentation neural network to generate center predictions using L1 regression, $l_{cen}$, directly correlated to the heat map.

Thus, the loss function can be the loss $l_c$, a weighted sum of the loss $l_c$ and the regularization term, or a weighted sum of the loss $l_c$, the regularization term $l_r$, and $l_{cen}$.

In some examples, after training, the instance segmentation neural network is configured to generate an instance segmentation mask over at least the first and second groups of first output pixels.

In some examples, the instance segmentation neural network can be configured to generate an instance segmentation mask by clustering the respective embeddings. The system can perform mean-shift clustering of the embeddings, as described in further detail below with reference to FIG. 3. In this example, the system trains the instance segmentation neural network on a loss function that includes loss $l_c$ and, optionally, the regularization term $l_r$.

Alternatively, the instance segmentation neural network can be configured to generate an instance segmentation mask by processing an input that includes the respective embeddings for the first group and the second group of first output pixels using an output neural network head, e.g., a multi-layer perceptron or other feedforward neural network, a convolutional neural network, or a Transformer neural network. That is, rather than clustering the pixels using the embeddings, the instance segmentation neural network uses the output neural network head to generate an instance segmentation output that defines an instance segmentation mask over the first and second group of first and second output pixels. In this example, the system trains the instance segmentation neural network on a loss function that is a weighted sum of the loss $l_c$, the regularization term $l_r$, and $l_{cen}$.

In some examples, the system additionally processes each training image using a semantic segmentation neural network to generate a respective semantic segmentation output for each of the first and second output pixels. In this example, an input to the output neural network head includes the respective segmentation outputs for each of the first and second output pixels.

Figure 3:
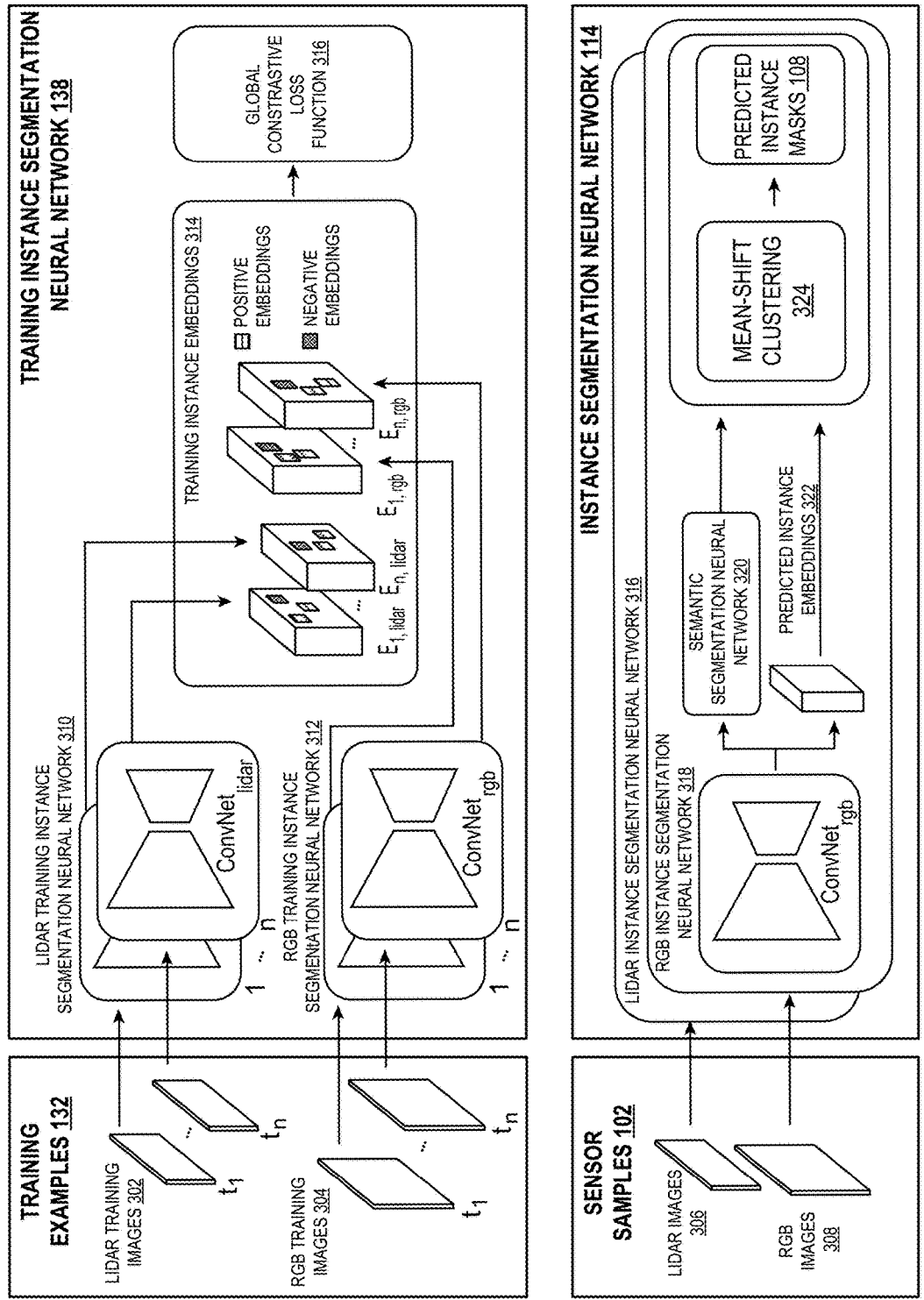
FIG. 3 is a diagram that shows an example of the training of the instance segmentation neural network and an example inference process for performing instance segmentation after training.

FIG. 3 is a diagram that shows an example of the training of the instance segmentation neural network and an example inference process for performing instance segmentation after training.

For convenience, the training instance segmentation neural network 138 and the instance segmentation neural network 114 will be described as being implemented by a system of one or more computers located in one or more locations, e.g., the on-board system 110 or the training system 122 of FIG. 1.

The system can train one or more training instance segmentation neural networks 138 using training examples 132. In particular, the system trains the training instance segmentation neural network 138 to generate accurate training instance embeddings 314, i.e., training instance embeddings 314 that can be used to generate accurate segmentation outputs, by using contrastive learning. In the example of FIG. 3 the system leverages information between sensors and consecutive frames by applying the contrastive loss jointly over embeddings from both sensor modalities during training.

Training examples 132 can include LIDAR training images 302, such as LIDAR range images captured by a LIDAR sensor, and RGB training images 304 captured by a camera.

During training, each training instance segmentation neural network processes respective sensor images to generate training instance embeddings 314. The training instance embeddings 314 can be for multiple consecutive sensor images of a temporal sequence (e.g., a sequence of length n of sensor images).

In particular, a LIDAR training instance segmentation neural network 210 processes the LIDAR training images 302 to generate LIDAR training instance embeddings.

Additionally, an RGB instance segmentation training neural network 312 processes the RGB training images 204 to generate RGB training instance embeddings. The LIDAR training instance embeddings and the RGB training instance embeddings each have a certain quantity of channels (e.g., 32 channels), and the LIDAR training instance embeddings and the RGB training instance embeddings include output pixels that each correspond to one or more pixels of the LIDAR training images 302 or the RGB training images 304, respectively.

As one example, the LIDAR training instance segmentation neural network 310 and the RGB training instance segmentation neural network 312 can each have a single state fully-convolutional neural network architecture, where each of the instance segmentation training neural networks generates training instance embeddings 314 for a corresponding image that include per-pixel embeddings for multiple pixels of the corresponding sensor image. The system uses the LIDAR training instance segmentation neural network 310, the RGB training instance segmentation neural network 312, or both to generate the training instance embeddings 314 in order to generate positive embedding pairs and negative embedding pairs of the output pixels included in the training instance embeddings 314.

In particular, the system receives ground truth data identifying regions of the training example 132 that correspond to object instances. For each object instance and for each training example 132 (e.g., a LIDAR training image 302 or an RGB training image 304), the system processes the training instance embeddings 214 to generate multiple positive embedding pairs and multiple negative embedding pairs. Each positive embedding pair includes two per-pixel embeddings that are associated with the same object instance (e.g., per-pixel embeddings for two pixels that each correspond to the region of the sensor image depicting the same object instance). Each negative embedding pair includes two per-pixel embeddings that are associated with different object instances (e.g., a first per-pixel embedding for a first pixel that corresponds to the region of the sensor image depicting the object instance and a second per-pixel embedding for a second pixel that does not correspond to the region of the sensor image depicting the object instance).

The system then trains each training instance segmentation neural network on a global contrastive loss to contrast the positive embeddings and the negative embeddings of both sensor modalities. The system uses the global contrastive loss to iteratively push positive embeddings closer and push negative embeddings away in the embedding space during training.

In some example, the system can contrast an RGB image and a LIDAR image of the environment to generate additional positive embedding pairs and negative embedding pairs as described above.

In some examples, for a given training example 132, the system can obtain additional positive embeddings and negative embeddings of temporally adjacent training examples 132 using an optical flow neural network to train each training instance segmentation neural network, as described in further detail below with reference to FIG. 5.

During inference, multiple instance segmentation neural networks 114 can be used on-board a vehicle, where each instance segmentation neural network processes respective sensor samples 106 from a sensor system on-board the vehicle and generates predicted instance embeddings 322. The predicted instance embeddings 322 include embeddings corresponding to each output pixel for the sensor sample 102.

In some examples, the system can also process the sensor sample 102 using a semantic segmentation neural network 320 to generate semantic segmentation labels for each pixel of the sensor sample 102. The semantic segmentation neural network 320 can be any appropriate semantic segmentation neural network that has been trained to assign semantic classes to output pixels.

In some examples, the system can generate predicted instance masks 108 by processing the predicted instance embeddings 322 using mean-shift clustering 324 or using a neural network head. The vehicle can send the predicted instance masks 108 to a planning system or a user interface system of the vehicle for navigating the vehicle through the environment.

The system can perform mean-shift clustering 324 to generate predicted instance masks 108 by processing the predicted instance embeddings 322 and the semantic segmentation labels.

To perform mean-shift clustering 324 for a given image, the system can randomly sample a point in the embedding space, and find all inlier points (output pixels) with cosine distance (scaled to be within [0; 1]) less than a threshold m, e.g., equal to 0.05, 0.1, 0.15. or 0.2, from the sampled point. The system then iterates by shifting the sampled point to the mean of the set of inliers, and repeats until convergence or some maximum number of iterations is reached. The system can repeat this process until all output pixels have been clustered and then identifies all of the output pixels within a given cluster as corresponding to the same object instance.

In some cases, to reduce errors on the transitions between masks that can cause thin artifacts along the boundaries, the system can filter out masks with an area to perimeter ratio less than a threshold r, e.g., r=2, 4, 6, or 8.

As this method computes distances across the entire image, no assumptions about the connectivity of each mask are made, and so arbitrarily distributed instances can be detected.

For example, a LIDAR instance segmentation neural network 316 can process LIDAR images 306 and an RGB instance segmentation neural network 318 can process RGB images 308 to generate instance masks 326. The LIDAR instance segmentation neural network 316 and the RGB instance segmentation neural network 318 can have a similar architecture as LIDAR training instance segmentation neural network 310 and RGB training instance segmentation neural network 312.

In particular, the RGB instance segmentation neural network 318 processes the RGB images 308 to generate predicted instance embeddings 322.

In some examples, for each object instance, the system uses a neural network head to generate predicted instance masks 108.

For example, the system can use a center regression neural network head to generate a heatmap around a geometric center of each object instance. The system uses the center regression head to estimate the geometric center of each object instance, and the system computes a mean of the embeddings associated with each object instance using the estimated geometric center.

The system then iteratively assigns the mean of the geometric center for each object instance, and the system outputs a final instance mask 108 for each object instance after a certain quantity of iterations.

In some other examples, the system concatenates the predicted instance embeddings 322 to the semantic labels generated by the semantic segmentation neural network 320. The semantic segmentation neural network 320 performs semantic segmentation for each RGB image 308 by generating a semantic mask for each RGB image 308, where each pixel of the RGB image 308 is associated with a semantic label.

In this example, the system then uses the semantic masks and the predicted instance embeddings 322 to generate predicted instance masks 108 by performing mean shift clustering 324.

In particular, the system performs mean-shift clustering 324 by clustering multiple embeddings of each object instance using the semantic labels. For example, the system assigns semantic classes to each cluster of embeddings for each object instance based on a majority of semantic labels of the embeddings in the cluster.

The system generates the instance masks based on the assigned semantic classes and object instances for each cluster corresponding to pixels of the RGB image 308. Additionally, the system can generate a confidence score for each instance mask of the RGB image 308.

Figure 4:
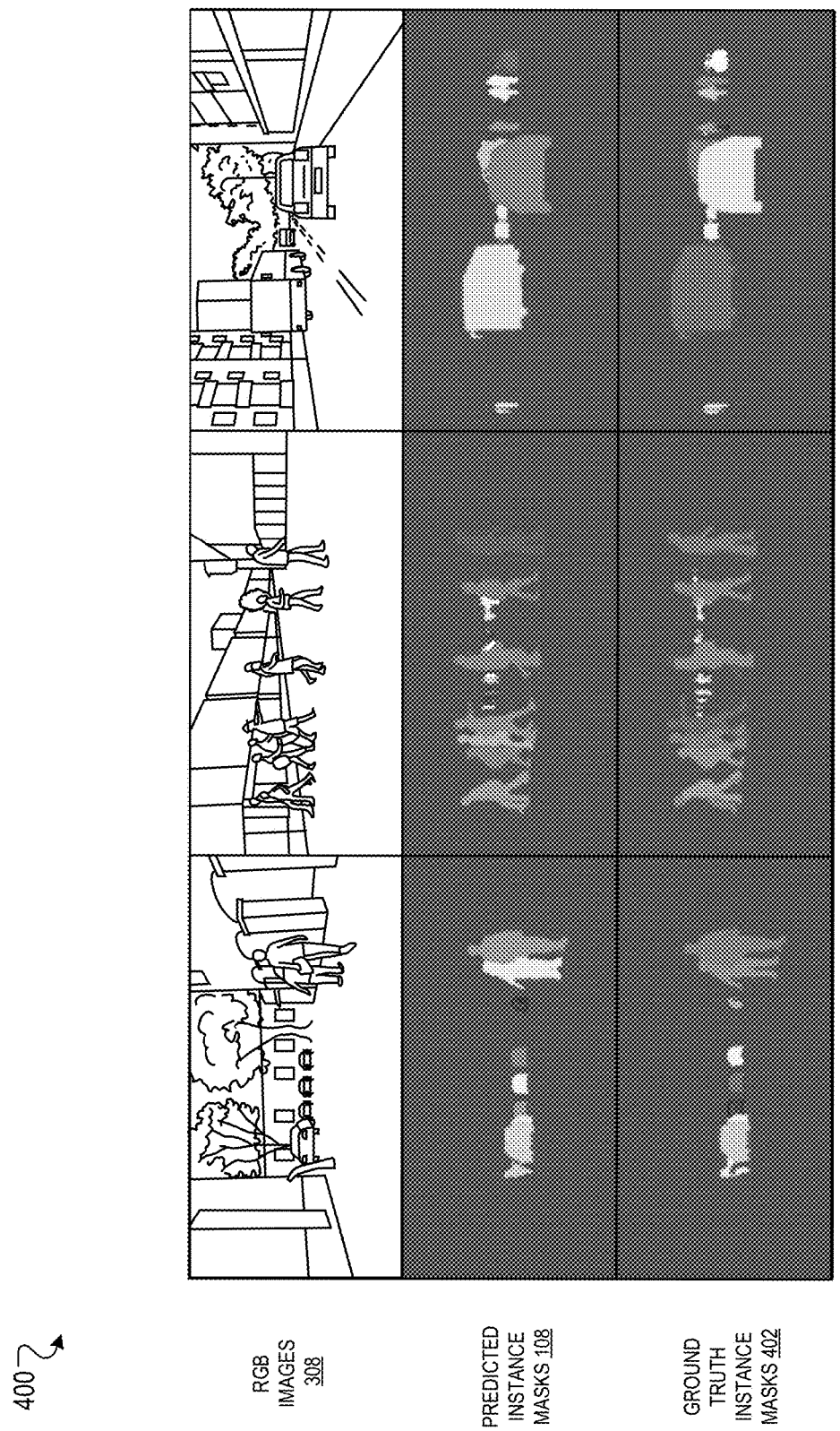
FIG. 4 is a diagram of generating an embedding output by processing sensor samples.

FIG. 4 shows a diagram of generating an embedding output by processing sensor samples. For convenience, the sensor samples and the embedding outputs of the diagram 300 will be described as being processed and generated by a system of one or more computers located in one or more locations. For example, a system, e.g., the system 100 of FIG. 1, appropriately programmed in accordance with this specification, can process the sensor samples and generate the embedding output of the diagram 400.

The diagram 400 includes RGB images 308, predicted instance masks 108, and ground truth instance masks 402.

As described above, in some examples, the RGB instance segmentation neural network processes the RGB images 208 to generate predicted instance masks 108. The system can use the predicted instance masks 108 to robustly and precisely disentangle object instances across different classes. For example, the predicted instance masks include regions corresponding to different objects in the corresponding RGB images 308, such as vehicles and pedestrians. The on-board system of the vehicle can provide the predicted instance masks 226 to another system in order to safely navigate the vehicle.

The ground truth instance masks 402 illustrate the ground truth instance segmentation output for each object instance. In comparing the predicted instance masks 108 to the ground truth instance masks 402, the comparison illustrates the accurate disentanglement of the different object instances by the system.

Figure 5:
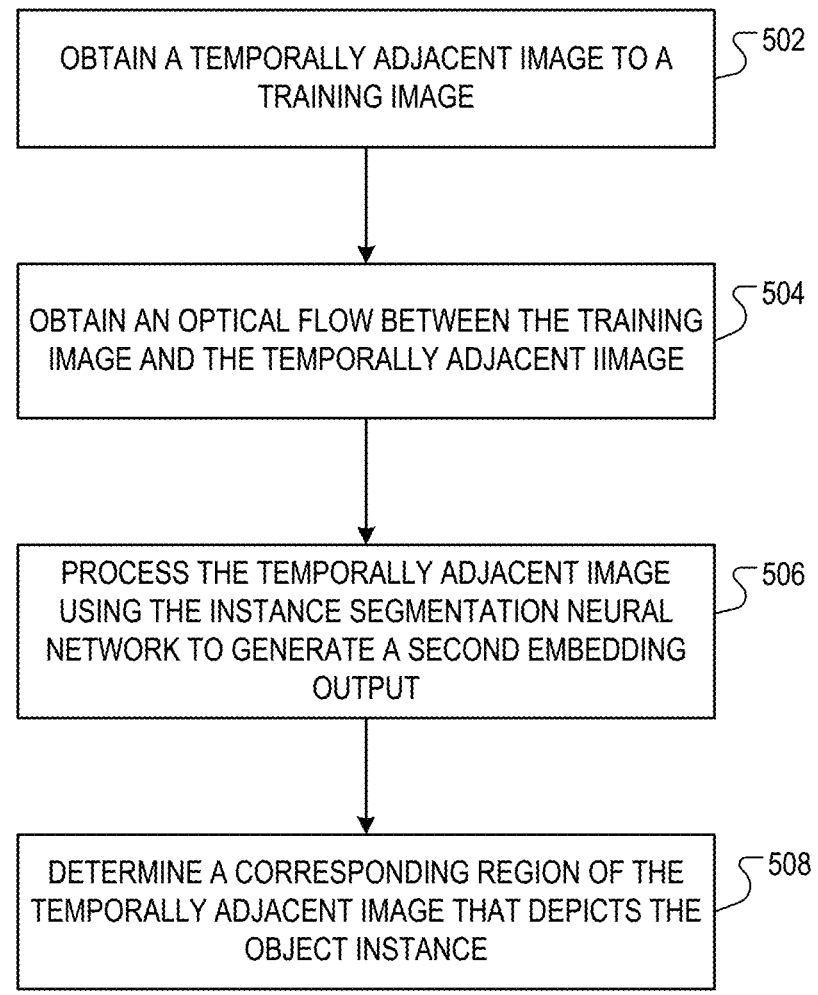
FIG. 5 is a flow diagram of an example process for using optical flow to train the image segmentation neural network.

FIG. 5 is a flow diagram of an example process for using optical flow to train the image segmentation neural network.

For convenience, the process 500 will be described as being performed by a system of one or more computers located in one or more locations. For example, a system, e.g., the system 100 of FIG. 1, appropriately programmed in accordance with this specification, can perform the process 500.

For one or more training images, the system obtains a temporally adjacent image to the training image (502). The training images can be camera images or LIDAR images.

The system obtains an optical flow between the training image and the temporally adjacent image (504). For example, the system can obtain the optical flow by processing the training image and the temporally adjacent image using a pre-trained optical flow neural network to generate the optical flow between the training image and the temporally adjacent image.

In particular, the pre-trained optical flow neural network can process individually labeled frames and unlabeled temporal sequences to generate the optical flow for temporally adjacent images in a temporal sequence.

The system processes the temporally adjacent image using the instance segmentation neural network to generate a second embedding output (506). The second embedding output includes a respective embedding for each of a third group of second output pixels for the temporally adjacent image.

For one or more of the object instances, the system then determines a corresponding region of the temporally adjacent image that depicts the object instance (508). In particular, the system processes the ground truth object instance data for the training image and the optical flow to generate the corresponding region of the temporally adjacent image. The system determines the corresponding region by warping the corresponding region of the training image depicting the object instance using the optical flow to generate the corresponding region of the temporally adjacent image depicting the object instance.

In particular, the system warps the ground truth object instance data and the semantic labels of the training image to the temporally adjacent image (e.g., a prior or subsequent image in the temporal sequence) for the particular object instance. The system applies nearest neighbor resampling to compute similarities between the original image and the other temporally adjacent image in order to align object instance labels of the same object instance across images. The system then combines the embeddings and warped semantic labels for the temporally adjacent with those of the current image to generate additional positive embedding pairs and negative embedding pairs.

In some cases, the system also computes occlusions according to the 'range map', defined by the number of points in the original image that map to the other image. The instance and semantic labels of occluded pixels, as well as pixels that have left the image, are set to invalid, and are not sampled for the contrastive loss In this case, the multiple positive embedding pairs include multiple second positive embedding pairs that each include a respective embedding for a first output pixel within the region of the training image that depicts the object instance and a respective embedding for a respective second output pixel within the region of the temporally adjacent image depicting the object instance. For example, the system can select, as an additional positive pair, each pair of output pixels that satisfies these criteria or can randomly select a specified number of output pixel pairs that satisfy the criteria.

Additionally, in this example, the multiple negative embedding pairs include multiple second negative embedding pairs that each include a respective embedding for a first output pixels not within the region of the training image that depicts the object instance and a respective embedding for a respective second output pixel that is also not within the region of the temporally adjacent image depicting the object instance. For example, the system can select, as an additional negative pair, each pair of output pixels that satisfies these criteria or can randomly select a specified number of output pixel pairs that satisfy the criteria.

Thus, by using an optical flow neural network to generate additional embedding pairs, the system can more efficiently train the training instance segmentation neural network to generate an embedding output that can be consistent across sensors and across time.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, a data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
obtaining a set of one or more training images and, for each training image, ground truth instance data that identifies, for each of one or more object instances, a corresponding region of the training image that depicts the object instance;
for each training image in the set:
processing the training image using an instance segmentation neural network to generate an embedding output comprising a respective embedding for each of a first plurality of first output pixels; and
training the instance segmentation neural network to minimize a loss function that includes a first term that, for each of the training images in the set for each of the one or more object instances depicted in the training image, encourages embeddings within positive embedding pairs to be more similar than embeddings within negative embedding pairs, wherein the positive embedding pairs include first embedding pairs that include two output pixels within the region of the training image that depicts the object instance and the negative embedding pairs include first negative embedding pairs that include one output pixel within the region of the training image that depicts the object instance and another output pixel that is not within the region of the training image that depicts the object instance.

2. The method of claim 1, wherein the embedding output further comprises a respective embedding for each of a second plurality of first output pixels, and wherein the method further comprises, for each training image in the set:
sampling the first plurality of first output pixels from a set of output pixels that includes the first plurality of first output pixels and the second plurality of first output pixels.

3. The method of claim 2, wherein the loss function further comprises a regularization term over a norm of a set of embeddings that comprises the respective embeddings for the first and second pluralities of first output pixels.

4. The method of claim 2, wherein the instance segmentation neural network is configured to generate an instance segmentation mask over at least the first and second pluralities of first output pixels by clustering the respective embeddings.

5. The method of claim 2, wherein the instance segmentation neural network is configured to process an input comprising the respective embeddings for the first and second pluralities of first and second output pixels using an output neural network head to generate an instance segmentation output that defines an instance segmentation mask over the first and second pluralities of first and second output pixels.

6. The method of claim 5, wherein the loss function includes a third term that measures errors in instance segmentation outputs for the one or more training images.

7. The method of claim 6, further comprising:
for each training image, processing the training image using a semantic segmentation neural network to generate a respective semantic segmentation output for each of the first and second output pixels, wherein:
the input to the output neural network head further comprises the respective semantic segmentation outputs for each of the first and second output pixels.

8. The method of claim 1, wherein the first term measures, for a given positive pair that includes a given first embedding and a given second embedding, a ratio between (i) a similarity between the given first embedding and the given second embedding and (ii) a sum of the similarities between the embeddings in negative embedding pairs that include the given first embedding and a respective other embedding.

9. The method of claim 8, wherein the similarity between the first embedding and the second embedding is an exponentiation of a cosine similarity between the first embedding and the second embedding.

10. The method of claim 9, wherein the first term is based on a negative logarithm of the ratio.

11. The method of claim 1, further comprising:
for one or more of the training images in the set:
obtaining a temporally adjacent image to the training image;
obtaining an optical flow between the training image and the temporally adjacent image;
processing the temporally adjacent image using the instance segmentation neural network to generate a second embedding output comprising a respective embedding for each of a third plurality of second output pixels;
determining, from the ground truth object instance data for the training image and the optical flow and for each of one or more object instances, a corresponding region of the temporally adjacent image that depicts the object instance, wherein:
the plurality of positive embedding pairs comprise a plurality of second positive embedding pairs that each include (i) a respective embedding for a respective first output pixel that is within the region of the training image that depicts the object instance and (ii) a respective embedding for a respective second output pixel that is within the region of the temporally adjacent image that depicts the object instance.

12. The method of claim 11, wherein the plurality of negative embedding pairs comprise a plurality of second negative embedding pairs that each include (i) a respective embedding for a respective first output pixel that is within the region of the training image that depicts the object instance and (ii) a respective embedding for a respective second output pixel from the third plurality of second output pixels that is not within the region of the temporally adjacent image that depicts the object instance.

13. The method of claim 12, wherein determining, from the ground truth object instance data for the training image and the optical flow and for each of one or more object instances, a corresponding region of the temporally adjacent image that depicts the object instance comprises:

warping the corresponding region of the training image that depicts the object instance using the optical flow to generate the corresponding region of the temporally adjacent image that depicts the object instance.

14. The method of claim 13, wherein obtaining an optical flow between the training image and the temporally adjacent image comprises:

processing the training image and the temporally adjacent image using a pre-trained optical flow neural network to generate the optical flow between the training image and the temporally adjacent image.

15. The method of claim 1, further comprising:
for one or more of the training images in the set:
obtaining another image from a different modality captured within a specified time window of the training image;
obtaining second ground truth object instance data for the other image that identifies, for each of the one or more object instances depicted in the training image, a corresponding region of the other image that depicts the object instance;
processing the other image using a second instance segmentation neural network to generate a third embedding output comprising a respective embedding for each of a fourth plurality of third output pixels, wherein:
the plurality of positive embedding pairs comprise a plurality of third positive embedding pairs that each include (i) a respective embedding for a respective first output pixel that is within the region of the training image that depicts the object instance and (ii) a respective embedding for a respective third output pixel from the fourth plurality that is within the region of the other image that depicts the object instance.

16. The method of claim 15, wherein the plurality of negative embedding pairs comprise a plurality of third negative embedding pairs that each include (i) a respective embedding for a respective first output pixel that is within the region of the training image that depicts the object instance and (ii) a respective embedding for a respective third output pixel from the fourth plurality of third output pixels that is not within the region of the other image that depicts the object instance.

17. The method of claim 16, wherein the other image is generated from measurements of a LiDAR sensor.

18. The method of claim 17, wherein the second instance segmentation neural network is being trained jointly with the instance segmentation neural network.

19. A system comprising:
one or more computers; and
one or more storage devices storing instructions that, when executed by the one or more computers, cause the one or more computers to perform operations comprising:

obtaining a set of one or more training images and, for each training image, ground truth instance data that identifies, for each of one or more object instances, a corresponding region of the training image that depicts the object instance;
for each training image in the set:
processing the training image using an instance segmentation neural network to generate an embedding output comprising a respective embedding for each of a first plurality of first output pixels; and
training the instance segmentation neural network to minimize a loss function that includes a first term that, for each of the training images in the set an for each of the one or more object instances depicted in the training image, encourages embeddings within positive embedding pairs to be more similar than embeddings within negative embedding pairs, wherein the positive embedding pairs include first embedding pairs that include two output pixels within the region of the training image that depicts the object instance and the negative embedding pairs include first negative embedding pairs that include one output pixel within the region of the training image that depicts the object instance and another output pixel that is not within the region of the training image that depicts the object instance.

20. One or more non-transitory computer-readable storage media storing encoded with computer program instructions that when executed by one or more computers cause the one or more computers to perform operations comprising:

obtaining a set of one or more training images and, for each training image, ground truth instance data that identifies, for each of one or more object instances, a corresponding region of the training image that depicts the object instance;
for each training image in the set:
processing the training image using an instance segmentation neural network to generate an embedding output comprising a respective embedding for each of a first plurality of first output pixels; and
training the instance segmentation neural network to minimize a loss function that includes a first term that, for each of the training images in the set an for each of the one or more object instances depicted in the training image, encourages embeddings within positive embedding pairs to be more similar than embeddings within negative embedding pairs, wherein the positive embedding pairs include first embedding pairs that include two output pixels within the region of the training image that depicts the object instance and the negative embedding pairs include first negative embedding pairs that include one output pixel within the region of the training image that depicts the object instance and another output pixel that is not within the region of the training image that depicts the object instance.

* * * * *